United States Patent
Matsushima

(10) Patent No.: US 8,179,444 B2
(45) Date of Patent: May 15, 2012

(54) INFORMATION PROCESSING APPARATUS FOR PERFORMING PRINT SETTING OF IMAGE DATA

(75) Inventor: Shuichiro Matsushima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1693 days.

(21) Appl. No.: 11/476,228

(22) Filed: Jun. 27, 2006

(65) Prior Publication Data

US 2007/0019223 A1    Jan. 25, 2007

(30) Foreign Application Priority Data

Jul. 25, 2005   (JP) .................................. 2005-214533

(51) Int. Cl.
*H04N 5/77* (2006.01)
(52) U.S. Cl. ................... 348/207.2; 348/231.3; 386/224
(58) Field of Classification Search ............ 348/231.99, 348/231.2, 207.1, 207.11, 207.2, 231.1, 231.3; 386/117, 123–126, 248, 224
See application file for complete search history.

(56) References Cited

U.S. PATENT DOCUMENTS

| | | | | |
|---|---|---|---|---|
| 6,005,690 | A * | 12/1999 | Suzuki et al. ................. | 358/527 |
| 6,736,476 | B2 * | 5/2004 | Inoue et al. ........................ | 347/3 |
| 6,956,671 | B2 * | 10/2005 | Monty et al. ..................... | 358/1.9 |
| 7,027,172 | B1 * | 4/2006 | Parulski et al. ............. | 358/1.15 |
| 7,286,256 | B2 * | 10/2007 | Herbert ........................ | 358/1.16 |
| 7,355,759 | B1 * | 4/2008 | Kokusho ....................... | 358/440 |
| 7,612,806 | B2 * | 11/2009 | Kazami et al. ............. | 348/231.1 |
| 2001/0009456 | A1 * | 7/2001 | Tanaka ............................ | 355/77 |
| 2002/0010722 | A1 * | 1/2002 | Takayama .................... | 707/527 |
| 2005/0083407 | A1 * | 4/2005 | Kokusho .................... | 348/207.2 |
| 2005/0151858 | A1 * | 7/2005 | Nozaki et al. .............. | 348/231.9 |
| 2007/0019020 | A1 * | 1/2007 | Wakai .............................. | 347/15 |
| 2008/0211927 | A1 * | 9/2008 | Nozaki et al. .............. | 348/231.7 |

FOREIGN PATENT DOCUMENTS

| | | | |
|---|---|---|---|
| JP | 2002-320173 | A | 10/2002 |
| JP | 2003-250110 | * | 9/2003 |
| JP | 2003-256546 | A | 9/2003 |
| JP | 2004-254062 | * | 9/2004 |
| JP | 2004-254189 | * | 9/2004 |
| JP | 2004-254189 | A * | 9/2004 |
| JP | 2004-256062 | * | 9/2004 |
| JP | 2004-274338 | * | 9/2004 |

OTHER PUBLICATIONS

Machine generated translation of 2004-254062 to Tsubakihara, Sep. 2004.*
Machin generated translation of 2004-274338 to Nakajima, Sep. 2004.*

* cited by examiner

*Primary Examiner* — David Harvey
(74) *Attorney, Agent, or Firm* — Canon USA Inc. IP Division

(57) ABSTRACT

An image processing apparatus includes a first recording/reproducing unit configured to record data on a first recording medium and reproduce the recorded data from the first recording medium, a second recording/reproducing unit configured to record data on a second recording medium and reproduce the recorded data from the second recording medium, a print information generating unit configured to generate print designation information about print processing of the image data recorded on the first recording medium; and a control unit configured to read the image data designated by the print designation information from the first recording medium, and control the first recording/reproducing unit and the second recording/reproducing unit so as to record the read image data and the print designation information on the second recording medium if it is determined that the print designation information cannot be recorded on the first recording medium.

33 Claims, 8 Drawing Sheets

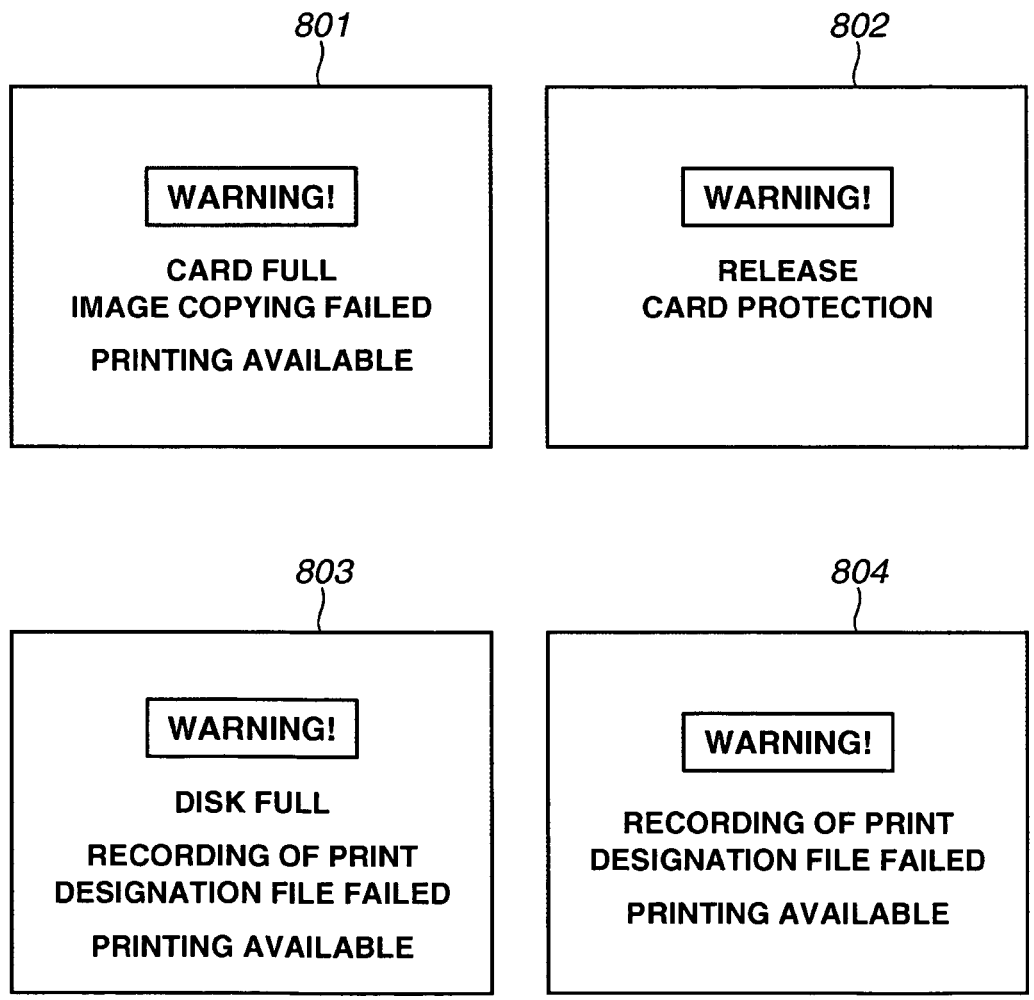

INFORMATION PROCESSING APPARATUS FOR PERFORMING PRINT SETTING OF IMAGE DATA

BACKGROUND OF THE INVENTION

1. Field of the Invention

The present invention relates to an image processing apparatus, and more particularly, to processing of print designation information about image data.

2. Description of the Related Art

Conventionally, digital cameras have been known which record an image signal as digital data on a memory card. In recent years, the number of pixels of an imaging sensor has increased to several million pixels, and as a result, higher quality images are now even more easily obtained as compared to previous conventional digital cameras. In addition to viewing the images recorded by the digital camera on a PC or a television screen, the recorded images are often viewed in a printed form.

In order to print the images captured by the digital camera, there are several methods, for example, transferring the image data to the PC to print it by a printer, directly connecting the camera to the printer, or bringing recording media such as a memory card to a printing service to print it there etc. When the image is printed by directly connecting the camera to the printer or by bringing recording media such as a memory card to printing service, it is possible to simplify the printing operation by recording a file in the recording media which designates images to print in advance. As the print designation information, the DPOF (Digital Print Order Format) is known. Making a print using the print designation information is discussed in, for example, Japanese Patent Application Laid-Open No. 2002-320173.

Further, in recent years, instead of the memory card, video cameras which record the captured image data on an optical disk such as a DVD (Digital Versatile Disc) have come to the market. With respect to types of the DVD, in addition to a rewritable DVD such as a DVD-RAM or a DVD-RW, a write-once disk such as a DVD-R is used.

In the case of the rewritable disk, it is possible to freely rewrite recorded data. However, in the case of the write-once disk, once the data is recorded, it is not possible to rewrite the data on the disk. Further, if a finalization process (termination process) is performed to make the disk compatible with other types of devices, the disk becomes a playback-only disk, and it is not possible to record data on the disk anymore.

Accordingly, in a video camera which uses the write-once media, after the finalization process is executed, it is not possible to write the print designation information. Therefore, the print designation information cannot be used in printing.

Hence, it would be beneficial to provide video camera or the like which is able to perform print setting of image data which is recorded on a recording medium that cannot record data any more.

SUMMARY OF THE INVENTION

One aspect of the present invention is to enable to perform print setting of image data which is recorded on a recording medium that cannot record data any more.

According to an aspect of the present invention, an image processing apparatus is provided which includes a first recording/reproducing unit configured to record data on a first recording medium and reproduce the recorded data from the first recording medium; a second recording/reproducing unit configured to record data on a second recording medium and reproduce the recorded data from the second recording medium; a print information generating unit configured to generate print designation information about print processing of the image data recorded on the first recording medium; and a control unit configured to determine whether the print designation information can be recorded on the first recording medium, and if it is determined that the print designation information cannot be recorded on the first recording medium, control the first recording/reproducing unit and the second recording/reproducing unit to read the image data designated by the print designation information from the first recording medium and record the read image data and the print designation information on the second recording medium.

According to another aspect of the present invention, an image processing apparatus is provided which includes a first recording/reproducing unit configured to record data on a first recording medium and reproduce the recorded data from the first recording medium; a second recording/reproducing unit configured to record data on a second recording medium and reproduce the recorded data from the second recording medium; a print information generating unit configured to generate print designation information about print processing of the image data recorded on the first recording medium; and a control unit configured to read the image data designated by the print designation information from the first recording medium and control the first recording/reproducing unit and the second recording/reproducing unit so as to record the read image data together with the print designation information on the second recording medium.

According to yet another aspect of the present invention, a method is provided for controlling an image processing apparatus, the apparatus including a first recording/reproducing unit configured to record data on a first recording medium and reproduce the recorded data from the first recording medium; a second recording/reproducing unit configured to record data on a second recording medium and reproduce the recorded data from the second recording medium; a print information generating unit configured to generate print designation information about print processing of the image data recorded on the first recording medium; and a control unit configured to determine whether the print designation information can be recorded on the first recording medium. Here, the method includes determining whether the print designation information can be recorded on the first recording medium and if it is determined that the print designation information cannot be recorded on the first recording medium, controlling the first recording/reproducing unit and the second recording/reproducing unit to read the image data designated by the print designation information from the first recording medium and record the read image data and the print designation information on the second recording medium.

And, according to still yet another aspect of the present invention, a computer readable medium is provided containing computer-executable instructions for controlling an image processing apparatus, the apparatus including a first recording/reproducing unit configured to record data on a first recording medium and reproduce the recorded data from the first recording medium; a second recording/reproducing unit configured to record data on a second recording medium and reproduce the recorded data from the second recording medium; a print information generating unit configured to generate print designation information about print processing of the image data recorded on the first recording medium; and a control unit configured to determine whether the print designation information can be recorded on the first recording medium. Here, the medium includes computer-executable instructions for determining whether the print designation information can be recorded on the first recording medium and if it is determined that the print designation information cannot be recorded on the first recording medium, computer-executable instructions for controlling the first recording/reproducing unit and the second recording/reproducing unit to read the image data designated by the print designation information from the first recording medium and record the read image data and the print designation information on the second recording medium.

Further exemplary embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

FIG. 8 illustrates exemplary warning screens, according to an aspect of the present invention.

DETAILED DESCRIPTION OF THE EMBODIMENTS

Various exemplary embodiments, features and aspects of the present invention will now be herein described in detail below with reference to the drawings.

Figure 1:
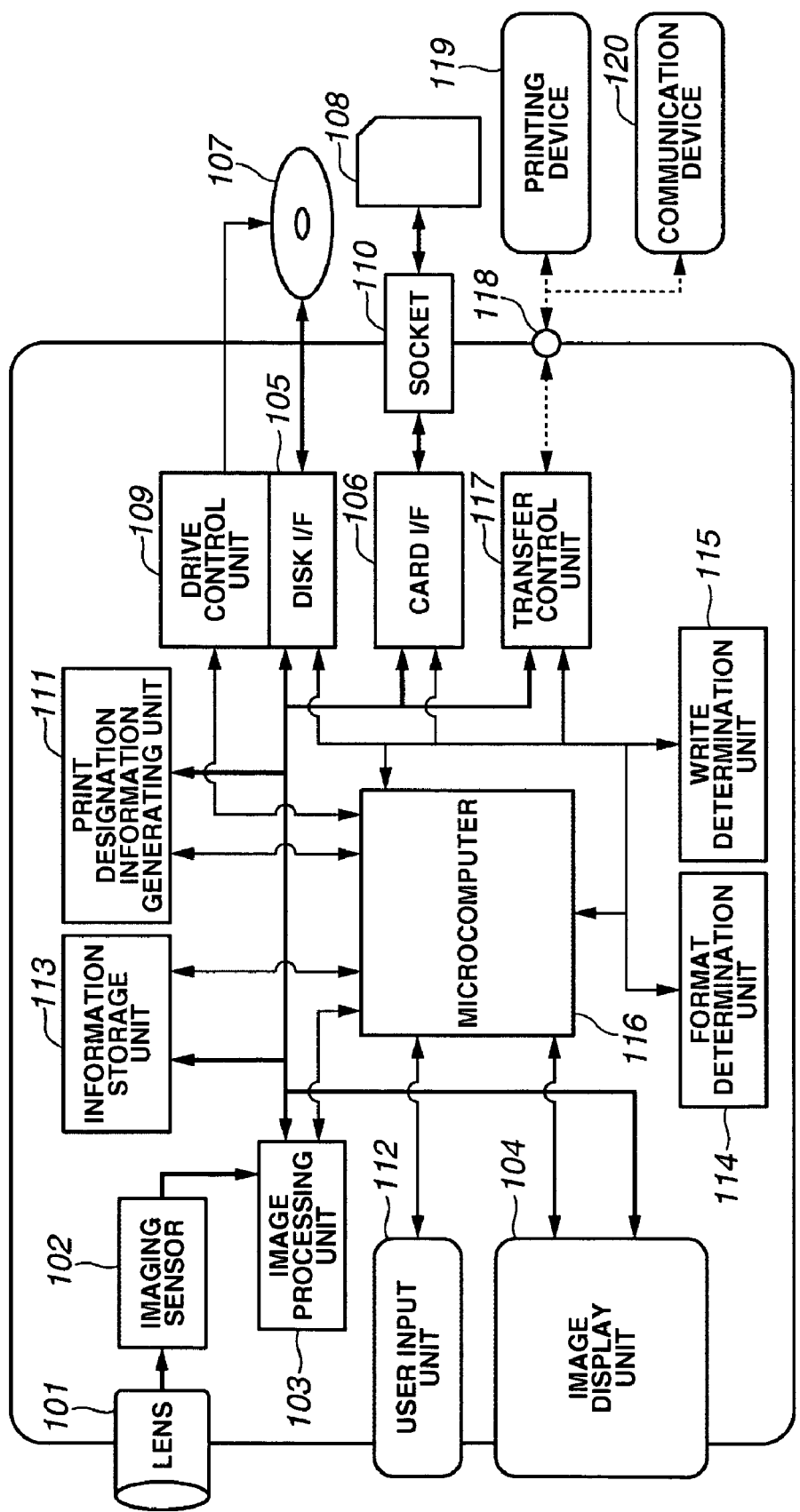
FIG. 1 illustrates an example architecture of a video camera according to an exemplary embodiment of the present invention.

FIG. 1 illustrates a block diagram of a digital video camera configured to capture and record a moving image or a still image according to an exemplary embodiment of the present invention. The structure of the digital video camera will be described below with reference to its operation. An optical unit (which includes a lens, an aperture, a motor driving these lens and aperture, etc.) 101 captures outside light. The captured outside light is imaged on a surface of an imaging sensor 102 and converted into an electronic signal. The signal is provided to an image processing unit 103 and takes a form of digital image data. The image data is also displayed on an image display unit 104 through a data bus, and can be seen as a captured image. The captured image data is written on a disk 107 and a memory card 108 by a disk I/F 105 and a card I/F 106 respectively. In this exemplary embodiment, an optical disk and a memory card are used as the recording media. The disk I/F 105 writes data on the disk 107 and reads the data from the disk 107 by a drive control unit 109 (which includes a laser oscillator, a lens, a spindle motor etc.). The memory card 108 is inserted through a socket 110 and the disk 107 is inserted and extracted by a mechanism (not shown).

Figure 2:
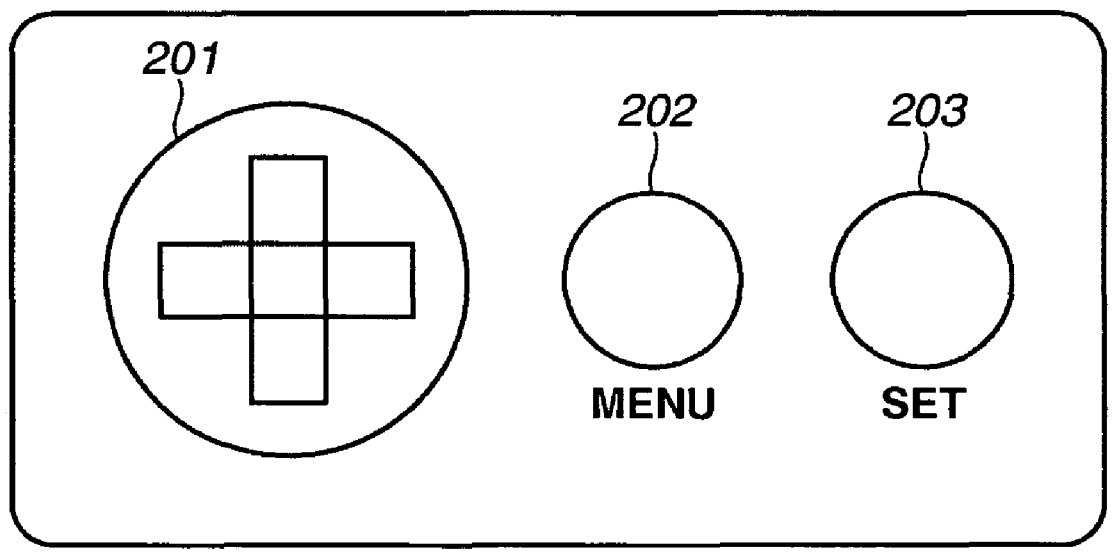
FIG. 2 illustrates an exemplary operation unit, according to an aspect of the present invention.

In the digital video camera according to this exemplary embodiment, it is possible to designate the image data recorded on the disk 107 or the card 108 and set the number of sheets to print. Further, the print designation information can be stored as a file or temporary data. The file or the temporary data is generated in a print designation information generating unit 111. The print designation information generating unit 111 generates print designation information according to an instruction from a user input unit 112. The user input unit includes, as shown in FIG. 2, various operation keys including three keys; a cross key 201, a menu key 202, and a set key 203. The print designation information generated according to the input by the user is stored on an information storage unit 113 as temporary data.

Since there are several types of recording formats for the disk 107 or the memory card 108, a format determination unit 114 determines a recording format by analyzing the data which is read when the disk 107 or the memory card 108 is inserted. At the same time, a write determination unit 115 detects remaining storage capacity of the disk 107, whether finalization processing is performed, remaining storage capacity of the memory card 108, or a state of protection, and determines whether it is possible to record data. Based on the determination information, a micro computer 116 determines which recording medium is to be used to record the print designation information being stored in the information storage unit 113. Detailed conditions about a record destination of the print designation information which are to be determined by the micro computer 116 will be described below.

Data communication with peripheral devices is performed through a transfer control unit 117. The transfer control unit 117 transmits and receives the data according to a format such as the USB or the IEEE 1394. The transfer control unit 117 can be connected through a cable to a communication device 120 which transfers data from a connector 118 for external device connection to a printing device 119 such as a printer or a PC.

Figure 3:
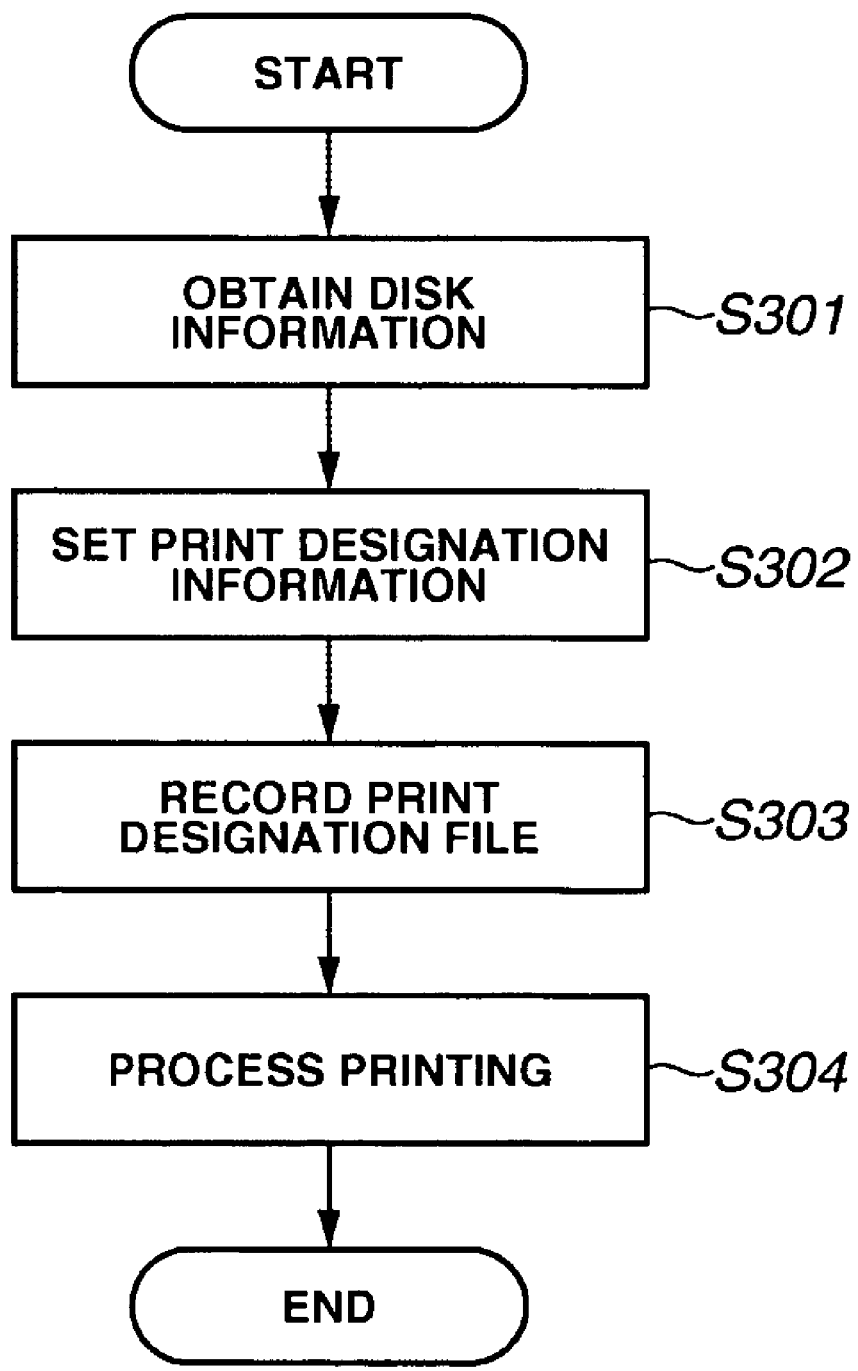
FIG. 3 is a flowchart for illustrating an exemplary print processing in the video camera, according to an aspect of the present invention.

FIG. 3 is a flowchart for illustrating an exemplary overall processing that starts from the insertion of the disk 107 until the print designation information is recorded on a recording medium and a print processing of the image is performed. When the disk 107 is inserted into the digital video camera body, information is obtained by reading necessary information written on the disk 107 (S301). Then, print designation information such as the number of sheets to print is set by the user operating the user input unit 112 during the reproduction of image data recorded on the disk 107 (S302). According to the set information, the print designation information is recorded on the disk 107 or the memory card 108 as a file (S303). If it is not possible to write on either the disk 107 or memory card 108, the print designation information is temporarily stored on the information storage unit 113. Then, printing of the image is performed (S304). For the printing, two printing methods can be considered.

By one method, the printing device 119 is directly connected to the digital video camera body. In this case, the print designation file recorded on the disk 107 or the memory card 108 can be used and the image which is designated to print can be printed by the number of sheets to be printed at one operation. Further, even if the print designation file cannot be recorded on the disk 107 or the memory card 108, the printing can be performed using the print designation information stored on the information storage unit 113. In this case, if the power supply of the digital video camera is shut off, the print designation information is deleted.

By the other printing method, the disk or the memory card is brought into an image printing service to print. This method is effective only in the case that the print designation file can be generated on the recording medium.

Figure 4:
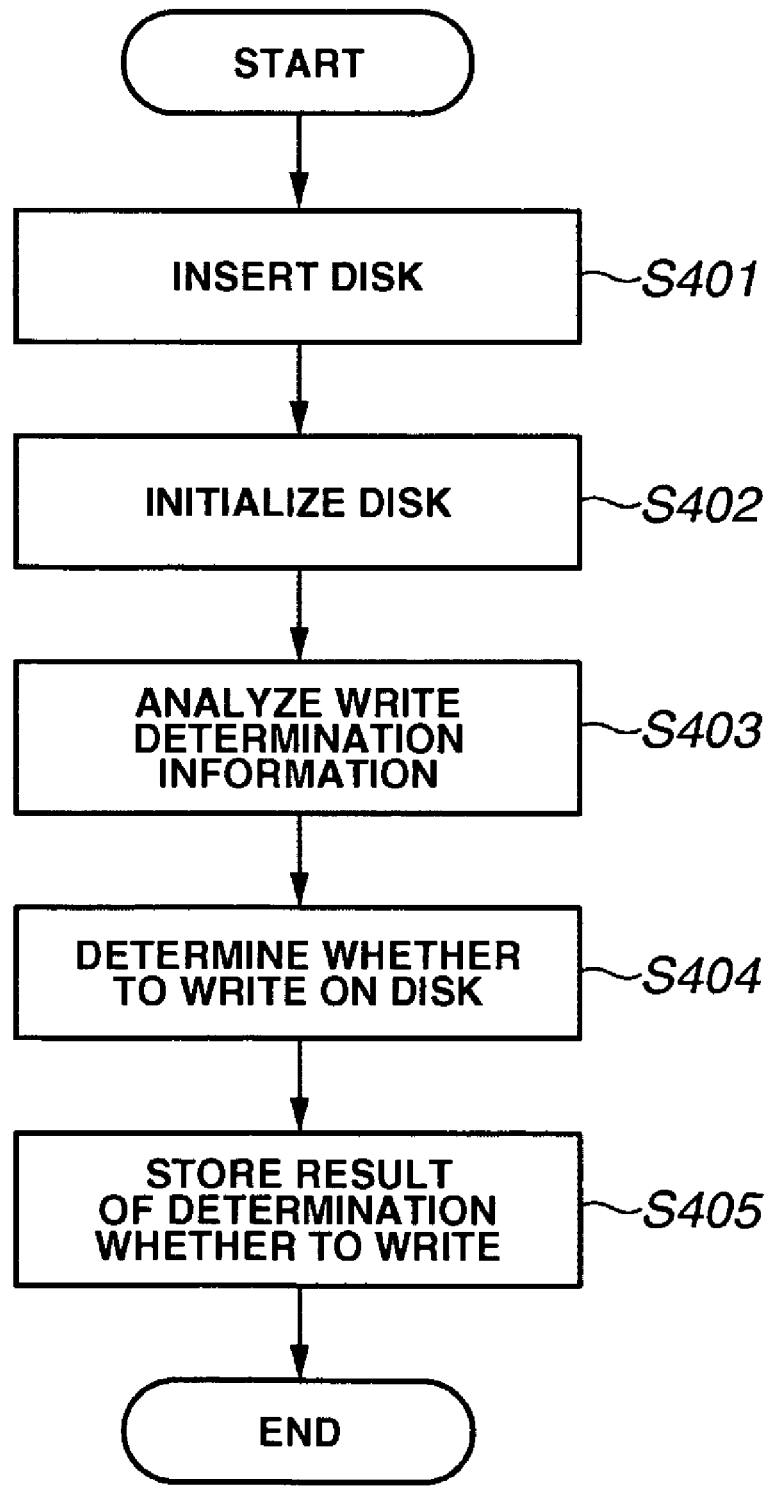
FIG. 4 is a flowchart for illustrating an exemplary processing of obtaining disk information, according to an aspect of the present invention.

A flowchart in FIG. 4 illustrates an exemplary information obtaining processing in step S301 in FIG. 3. When the disk 107 is inserted into the digital camera (S401), an initialization of the disk 107 (S402) is performed. In the initialization process, communication commands of the microcomputer 116, the drive control unit 109, and the disk I/F 105 are initialized so that the disk 107 can be used. Then, according to a determination result of the write determination unit 115 (S403), the microcomputer 116 analyzes the data format determination result temporarily stored on the information storage unit 113 and the information indicating whether to write on the disk 107. Based on the analysis result, the microcomputer determines whether to write the print designation file on the disk 107 (S404). The above-described processing is performed when the disk 107 is inserted. The result of determination in the step S404 is stored on the information storage unit 113 as an initial condition, indicating whether to write the print designation file (S405). The information stored on the information storage unit 113 is held until the power supply of the digital video camera is shut off.

Figure 5:
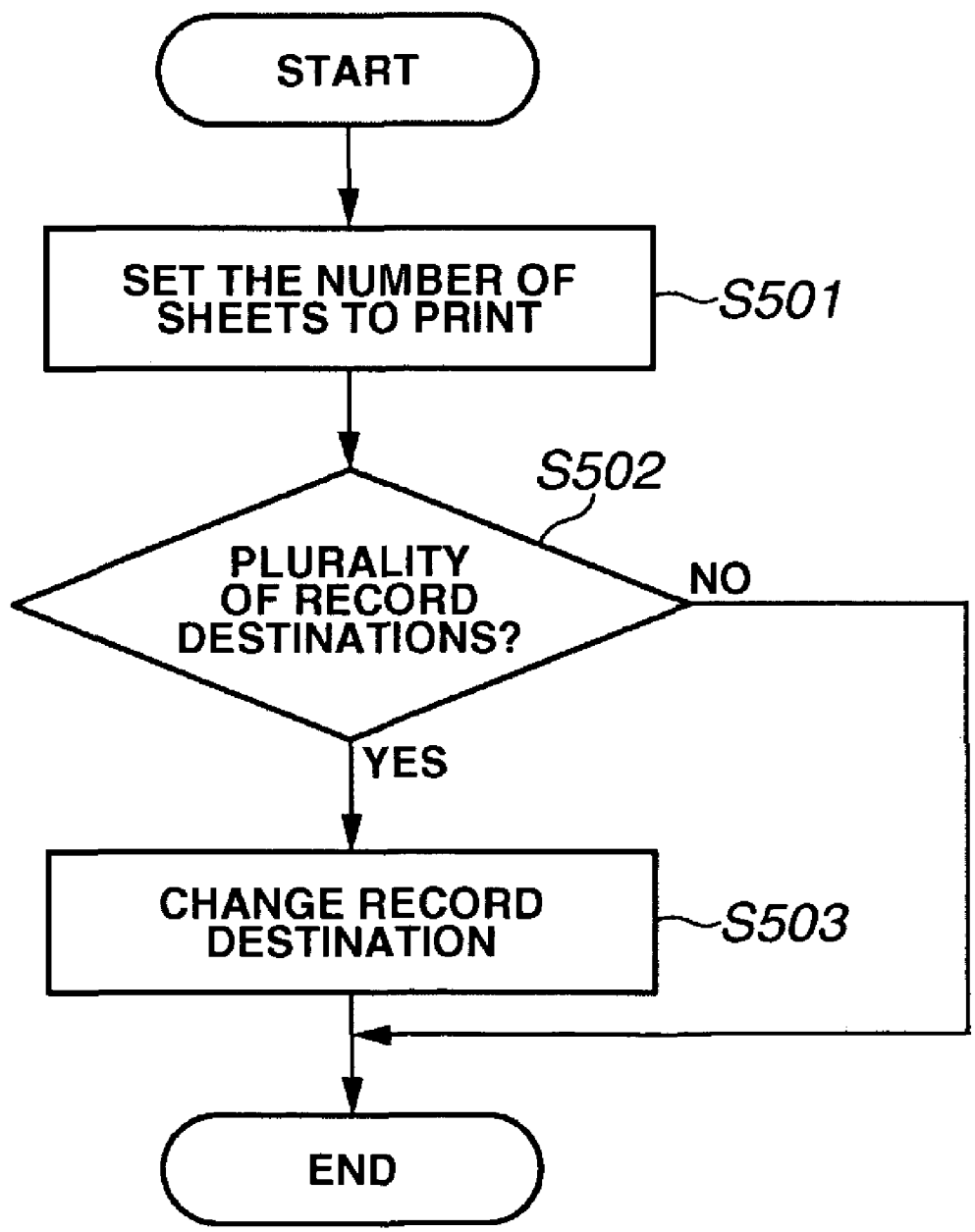
FIG. 5 is a flowchart for illustrating an exemplary print setting processing, according to an aspect of the present invention.

In a flowchart of FIG. 5, an exemplary setting operation of the print designation information in step S302 of FIG. 3 is shown. The user sets the number of sheets to print using the user input unit 112 (S501). Then, a determination is made as to whether or not there are a plurality of record destinations (S502). If there is not a plurality of record destinations (i.e., NO in S502), the setting operation ends. If there are a plurality of record destinations (i.e., YES in S502), the record destination is accordingly changed (S503). In other words, since the initial condition of the record destination has been already determined at step S405 in FIG. 4, it is not necessary to newly set the initial condition unless the record destination in the initial condition is changed. Accordingly, in such a case, only the number of sheets to print is set (S501) and the processing is finished.

Figure 7:
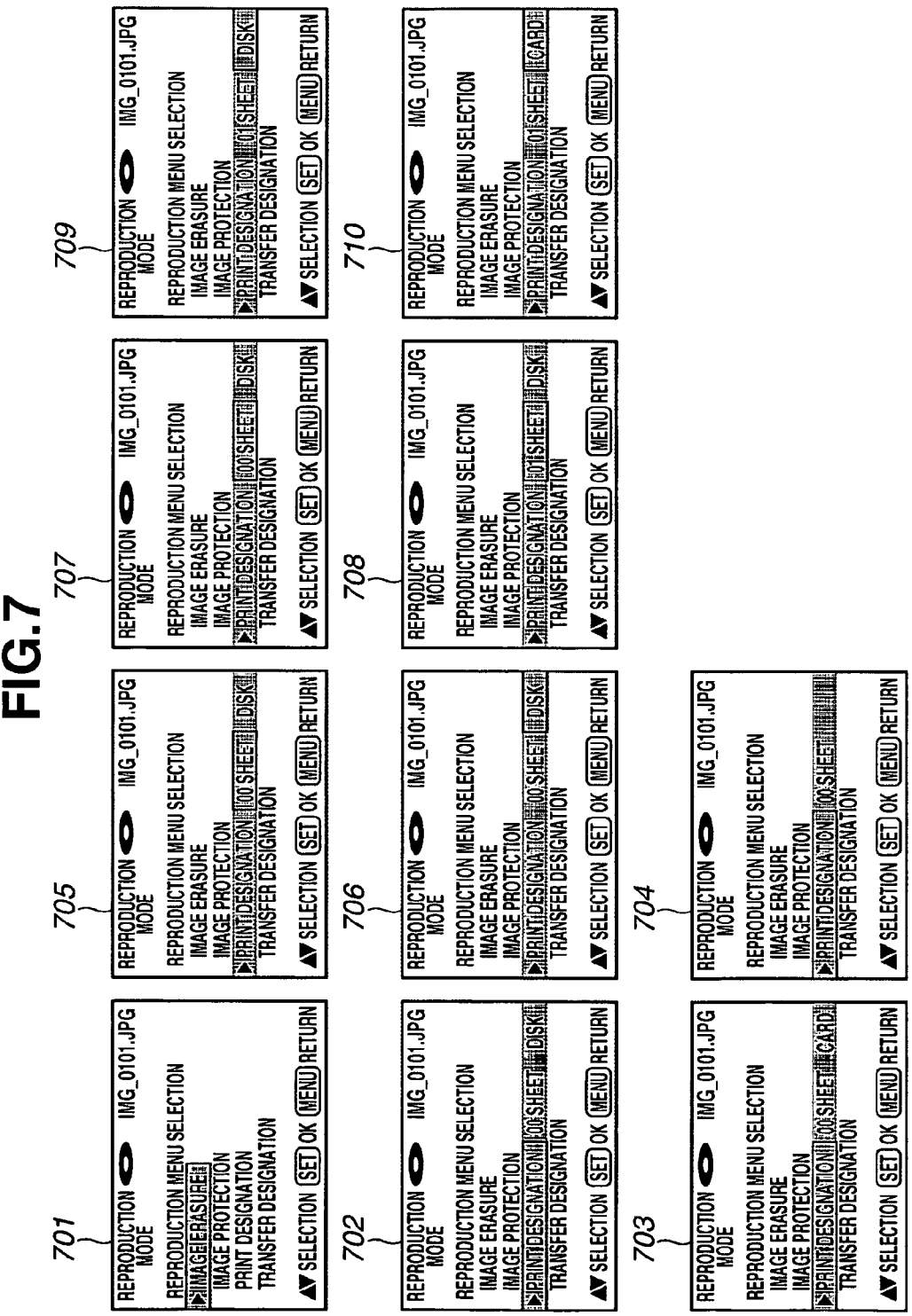
FIG. 7 illustrates exemplary print setting screens, according to an aspect of the present invention.

An exemplary print designation processing is described with reference to FIG. 7. During reproduction of the image for printing, if a menu key 202 is depressed, a reproduction menu selection screen is displayed (701). Then, a cursor can be moved by operating the cross key 201 upward and downward, and the cursor can be positioned to the position of "print designation". In the state that the cursor is positioned at the position of "print designation", the set number of sheets to print and the record destination of the print designation file are displayed. The record destination of the print designation file is set to be in the initial condition which has been set in the processing in FIG. 4 (702 and 703). However, if it is not possible to record on either of the disk 107 or the memory card 108, the record destination is blank (704). If the set key 203 is depressed in this state, the cursor can be positioned to the "set number of sheets to print" and to the "record destination of the print designation file" by operating the cross key 201 to right and left (705 and 706). By depressing the set key 203 in the state that the cursor is positioned to each setting, and moving the cross key 201 upward and downward, the contents can be changed (707 to 710).

Figure 6:
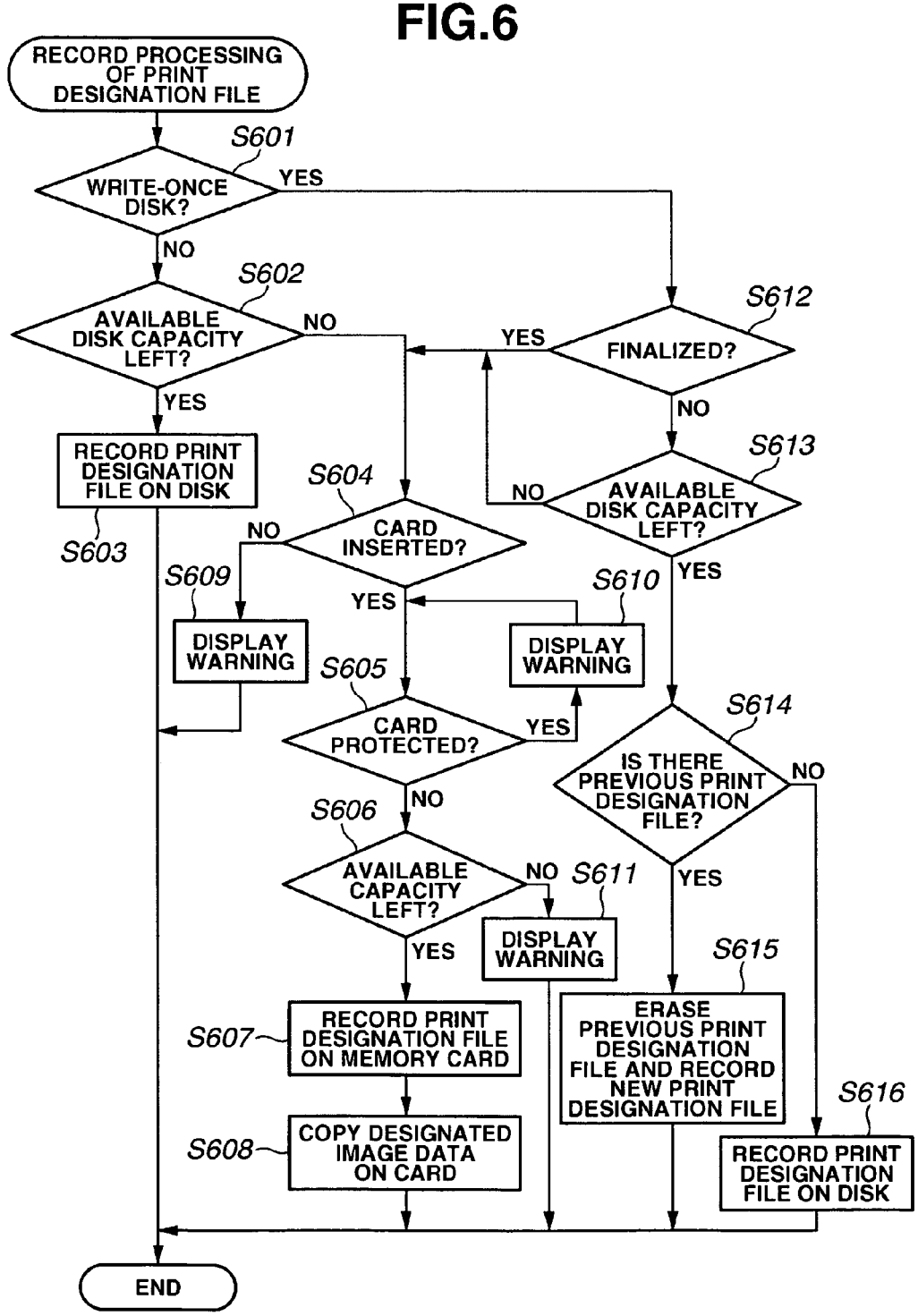
FIG. 6 is a flowchart for illustrating an exemplary processing of recording print designation information, according to an aspect of the present invention.

Next, an exemplary recording processing of the designated print setting information is described with reference to a flowchart in FIG. 6. First, the microcomputer 116 determines whether the disk 107 which is being inserted is a write-once disk such as a DVD-R (S601). If the disk 107 is a rewritable disk such as a DVD-RW (No at step S601), the microcomputer 116 detects available disk capacity of the disk 107 and determines whether the available disk capacity is enough to record the print designation file (S602). If it is determined that the print designation file can be recorded (Yes at step S602), the microcomputer 116 records the print designation file on the disk 107 (S603).

If, at step 602, it is determined that the available disk capacity is not enough to record the print designation file, the microcomputer 116 determines whether the memory card 108 is being inserted into the video camera (S604). If the memory card 108 is inserted, (Yes at step S604), the microcomputer 116 determines whether the memory card 108 is protected (S605). If the memory card is protected (Yes at step S605), the microcomputer 116 displays a warning screen 802 shown in FIG. 8 on the image display unit 104 so as to release the protection (S610) and returns to step S605.

If it is determined that the memory card 108 is not protected (No at step S605), the microcomputer 116 detects the available recording capacity of the memory card 108 and determines whether the print designation file and all of the image data designated by the print designation file can be recorded (S606). If it is determined that the remaining recording capacity is enough to perform recording (Yes at step S606), the microcomputer 116 records the print designation file on the memory card 108 (S607). Then, if the print designation file has already been recorded on the memory card 108, the microcomputer 116 rewrites the contents. Further, the microcomputer 116 reads the designated image data from the disk 107, and copies the read image data to the memory card 108 (S608). Then the process ends.

On the other hand, if the available recording capacity in the memory card 108 is not enough to record (No at step S606), the microcomputer 116 displays a warning screen 801 shown in FIG. 8 on the image display unit 104 (S611). In this case, since the print designation file is stored on the information storage unit 113, if a print instruction is given later, it is possible to perform printing based on the print designation information stored on the information storage unit 113. Then the process ends.

If the memory card 108 has not been inserted at step S604, the microcomputer 116 displays a warning screen 803 or 804 shown in FIG. 8 on the image display unit 104 (S609). In particular, if the processing proceeds from step S602 through step S604 to step S609, the microcomputer 116 displays a warning screen 803. If the processing proceeds from step S612 through step S604 to step S609 as described below, the microcomputer 116 displays a warning screen 804.

If it is determined that the disk 107 which is being inserted is a write-once disk, the microcomputer 116 determines whether the disk 107 has been finalized (S612). If it is determined that the disk 107 has been finalized (Yes at step S612), the processing proceeds to step S604. If it is determined that the disk 107 has not been finalized (No at step S612), the microcomputer 116 detects available disk capacity of the disk 107 and determines whether the available disk capacity is enough to record the print designation file (S613). If it is determined that the available disk capacity is enough to record (Yes in step S613), the microcomputer 116 determines whether the print designation file has already been recorded (S614). If it is determined that the print designation file has already been recorded (Yes at step S614), the microcomputer 116 erases the previous print designation file and records a new print designation file on the disk 107 (S615). On the other hand, if it is determined that the print designation file has not been recorded (No at step S614), the microcomputer 116 records the print designation file on the disk 107 without change (S616).

Further it is noted that in an alternative approach, before performing the recording process in step S607, the microcomputer 116 may perform the following process to make a user confirm whether the print designation file is to be recorded on the memory card 108. That is, before performing the recording process of the print instruction file, the microcomputer 116 displays a confirmation screen (not shown) on the image display unit 104 to make the user confirm whether or not the print designation file is to be recorded on the memory card 108. If the user approves recording the print designation file on the memory card 108 in the confirmation screen, the microcomputer 116 records the print designation file on the memory card 108. If the user does not approve recording the print designation file in the confirmation screen, the microcomputer 116 displays a warning screen 803 or 804 shown in FIG. 8 on the image display unit 104. Then the process ends.

As described above, in the exemplary embodiment, if the print setting is performed to the image recorded on the disk to which no data can be added or the recorded data on the disk cannot be rewritten, the print designation file about the image data is recorded on the memory card which is inserted together with the disk. That is, the designated image data is read from the disk and copied to the memory card. Thus, it is possible to print the image which is recorded on the disk using the print designation file.

Further, in the case that the print designation file cannot be recorded on the disk, the print designation file is recorded on the memory card while the designated image data is copied from the disk to the memory card. Accordingly, it is possible to realize the image printing by using the print designation file.

In the exemplary embodiment, although the two types of recording media; the disk and the memory card, are used, it is also possible to use recording media other than the disk and memory card. Further, more than three types of recording media can be used in an apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-214533 filed Jul. 25, 2005, which is hereby incorporated by reference herein in its entirety.

What is claimed:

1. An information processing apparatus comprising:
   a recording/reproducing unit that records data on a first recording medium and reproduces recorded data from the first recording medium;
   a recording unit that records data on a second recording medium;
   a generator that generates print designation information about print processing of image data recorded on the first recording medium; and
   a controller that determines whether the print designation information can be recorded on the first recording medium, and when it is determined that the print designation information cannot be recorded on the first recording medium, controls the recording/reproducing unit and the recording unit to read the image data designated by the print designation information from the first recording medium and record the read image data and the print designation information on the second recording medium.

2. The information processing apparatus according to claim 1, wherein the controller determines whether the print designation information can be recorded on the first recording medium based on available recording capacity of the first recording medium.

3. The information processing apparatus according to claim 1, wherein the controller determines whether the print designation information can be recorded on the first recording medium based on whether the first recording medium has been finalized.

4. The information processing apparatus according to claim 1, wherein the first recording medium includes a rewritable recording medium and a write-once recording medium, and the controller determines whether the print designation information can be recorded based on whether the first recording medium is the rewritable recording medium or the write-once recording medium.

5. The information processing apparatus according to claim 1, wherein the controller further compares available recording capacity of the second recording medium with an amount of data of the print designation information and the image data designated by the print designation information, and when it is determined that the available recording capacity of the second recording medium is equal to or larger than the amount of data, the controller controls the recording/reproducing unit and the recording unit so as to record the print designation information and the image data designated by the print designation information on the second recording medium, and when it is determined that the available recording capacity of the second recording medium is smaller than the amount of data, the controller controls the recording/reproducing unit and the recording unit so as to prohibit to record the print designation information and the image data on the second recording medium.

6. The information processing apparatus according to claim 1, wherein the controller controls the recording/reproducing unit so as to record the print designation information on the first recording medium when the print designation information can be recorded on the first recording medium.

7. The information processing apparatus according to claim 1, further comprising an image capture unit that obtains image data,
   wherein the recording/reproducing unit and the recording unit record the image data obtained by the image capture unit on the first recording medium and the second recording medium respectively.

8. A method for controlling an information processing apparatus, the apparatus including a recording/reproducing unit that records data on a first recording medium and reproduces recorded data from the first recording medium; a recording unit that records data on a second recording medium; a generator that generates print designation information about print processing of the image data recorded on the first recording medium; and a controller that determines whether the print designation information can be recorded on the first recording medium, the method including:
   determining whether the print designation information can be recorded on the first recording medium and when it is determined that the print designation information cannot be recorded on the first recording medium,
   controlling the recording/reproducing unit and the recording unit to read the image data designated by the print designation information from the first recording medium and record the read image data and the print designation information on the second recording medium.

9. The method according to claim 8, further including determining whether the print designation information can be recorded on the first recording medium based on available recording capacity of the first recording medium.

10. The method according to claim 8, further including determining whether the print designation information can be recorded on the first recording medium based on whether the first recording medium has been finalized.

11. The method according to claim 8, further including determining whether the print designation information can be recorded based on whether the first recording medium is a rewritable recording medium or a write-once recording medium.

12. The method according to claim 8, further including comparing available recording capacity of the second recording medium with an amount of data of the print designation information and the image data designated by the print designation information, and when it is determined that the available recording capacity of the second recording medium is equal to or larger than the amount of data, controlling the recording/reproducing unit and the recording unit so as to record the print designation information and the image data designated by the print designation information on the second recording medium, and when it is determined that the available recording capacity of the second recording medium is smaller than the amount of data, controlling the recording/reproducing unit and the recording unit to prohibit to record the print designation information and the image data on the second recording medium.

13. The method according to claim 8, further including controlling the recording/reproducing unit so as to record the print designation information on the first recording medium when the print designation information can be recorded on the first recording medium.

14. The method according to claim 8, wherein the information apparatus further includes an image capture unit, the method further including recording image data obtained by the image capture unit on the first recording medium and the second recording medium respectively.

15. A non-transitory computer readable medium containing computer-executable instructions for controlling an information processing apparatus, the apparatus including a recording/reproducing unit that records data on a first recording medium and reproduces recorded data from the first recording medium; a recording unit that records data on a second recording medium; a generator that generates print designation information about print processing of the image data recorded on the first recording medium; and a controller that determines whether the print designation information can be recorded on the first recording medium, the medium including:
   computer-executable instructions for determining whether the print designation information can be recorded on the first recording medium,
   computer-executable instructions for, when it is determined that the print designation information cannot be recorded on the first recording medium, controlling the recording/reproducing unit and the recording unit to read the image data designated by the print designation information from the first recording medium and record the read image data and the print designation information on the second recording medium.

16. The computer readable medium according to claim 15, further including computer-executable instructions for determining whether the print designation information can be recorded on the first recording medium based on available recording capacity of the first recording medium.

17. The computer readable medium according to claim 15, further including computer-executable instructions for determining whether the print designation information can be recorded on the first recording medium based on whether the first recording medium has been finalized.

18. The computer readable medium according to claim 15, further including computer-executable instructions for determining whether the print designation information can be recorded based on whether the first recording medium is a rewritable recording medium or a write-once recording medium.

19. The computer readable medium according to claim 15, further including computer-executable instructions for comparing available recording capacity of the second recording medium with an amount of data of the print designation information and the image data designated by the print designation information, and when it is determined that the available recording capacity of the second recording medium is equal to or larger than the amount of data, controlling the recording/reproducing unit and the recording unit so as to record the print designation information and the image data designated by the print designation information on the second recording medium, and when it is determined that the available recording capacity of the second recording medium is smaller than the amount of data, controlling the recording/reproducing unit and the recording unit to prohibit to record the print designation information and the image data on the second recording medium.

20. The computer readable medium according to claim 15, further including computer-executable instructions for controlling the recording/reproducing unit so as to record the print designation information on the first recording medium when the print designation information can be recorded on the first recording medium.

21. The computer readable medium according to claim 15, wherein the information processing apparatus further includes an image capture unit, the medium further including computer-executable instructions for recording image data obtained by the image capture unit on the first recording medium and the second recording medium respectively.

22. An information processing apparatus for performing print setting of image data, the apparatus comprising:
   a recording/reproducing unit that records data on a first recording medium and reproduces recorded data from the first recording medium;
   a recording unit that records data on a second recording medium;
   a generator that generates print designation information about print processing of image data recorded on the first recording medium; and
   a controller that controls the recording/reproducing unit and the recording unit;
   wherein the controller controls the recording/reproducing unit and the recording unit to read the image data designated by the print designation information from the first recording medium and record the read image data and the print designation information on the second recording medium, when the print designation information cannot be recorded on the first recording medium, and
   wherein the controller controls the recording/reproducing unit to record the print designation information on the first recording medium, when the print designation information can be recorded on the first recording medium.

23. The information processing apparatus according to claim 22,
wherein the controller controls the recording/reproducing unit and the recording unit to read the image data designated by the print designation information from the first recording medium and record the read image data and the print designation information on the second recording medium, when the first recording medium lacks a capacity for recording the print designation information, and
wherein the controller controls the recording/reproducing unit to record the print designation information on the first recording medium, when the first recording medium has enough capacity for recording the print designation information.

24. The information processing apparatus according to claim 22,
wherein the controller controls the recording/reproducing unit and the recording unit to read the image data designated by the print designation information from the first recording medium and record the read image data and the print designation information on the second recording medium, when the first recording medium has been finalized, and
wherein the controller controls the recording/reproducing unit to record the print designation information on the first recording medium, when the first recording medium has not been finalized.

25. The information processing apparatus according to claim 22,
wherein the first recording medium includes a rewritable recording medium and a write-once recording medium,
wherein the controller controls the recording/reproducing unit and the recording unit to read the image data designated by the print designation information from the first recording medium and record the read image data and the print designation information on the second recording medium, when the first recording medium is a write-once recording medium, and
wherein the controller controls the recording/reproducing unit to record the print designation information on the first recording medium, when the first recording medium is a rewritable recording medium.

26. A method for controlling an information processing apparatus, the apparatus including a recording/reproducing unit that records data on a first recording medium and reproduces recorded data from the first recording medium; a recording unit that records data on a second recording medium; a generator that generates print designation information about print processing of image data recorded on the first recording medium; and a controller that controls the recording/reproducing unit and the recording unit, the method including:
controlling the recording/reproducing unit and the recording unit to read the image data designated by the print designation information from the first recording medium and record the read image data and the print designation information on the second recording medium, when the print designation information cannot be recorded on the first recording medium, and
controlling the recording/reproducing unit to record the print designation information on the first recording medium, when the print designation information can be recorded on the first recording medium.

27. The method according to claim 26, further including:
controlling the recording/reproducing unit and the recording unit to read the image data designated by the print designation information from the first recording medium and record the read image data and the print designation information on the second recording medium, when the first recording medium lacks a capacity for recording print designation information; and
controlling the recording/reproducing unit to record the print designation information on the first recording medium, when the first recording medium has enough capacity for recording print designation information.

28. The method according to claim 26, further including:
controlling the recording/reproducing unit and the recording unit to read the image data designated by the print designation information from the first recording medium and record the read image data and the print designation information on the second recording medium, when the first recording medium has been finalized; and
controlling the recording/reproducing unit to record the print designation information on the first recording medium, in a case where the first recording medium has not been finalized.

29. The method according to claim 26, wherein the first recording medium includes a rewritable recording medium and a write-once recording medium, the method further including:
controlling the recording/reproducing unit and the recording unit to read the image data designated by the print designation information from the first recording medium and record the read image data and the print designation information on the second recording medium, when the first recording medium is a write-once recording medium; and
controlling the recording/reproducing unit to record the print designation information on the first recording medium, when the first recording medium is a rewritable recording medium.

30. A non-transitory computer readable medium containing computer-executable instructions for controlling an information processing apparatus, the apparatus including a recording/reproducing unit that records data on a first recording medium and reproduces recorded data from the first recording medium; a recording unit that records data on a second recording medium; a generator that generates print designation information about print processing of image data recorded on the first recording medium; and a controller that controls the recording/reproducing unit and the recording unit, the medium including:
computer-executable instructions for controlling the recording/reproducing unit and the recording unit to read image data designated by the print designation information from the first recording medium and record the read image data and the print designation information on the second recording medium, when the print designation information cannot be recorded on the first recording medium, and
computer-executable instructions for controlling the recording/reproducing unit to record the print designation information on the first recording medium, when the print designation information can be recorded on the first recording medium.

31. The computer readable medium according to claim 30, further including computer-executable instructions for:
computer-executable instructions for controlling the recording/reproducing unit and the recording unit to read image data designated by the print designation information from the first recording medium and record the read image data and the print designation information on the second recording medium, when the first recording medium lacks a capacity for recording print designation information; and computer-executable instructions for controlling the recording/reproducing unit to record the print designation information on the first recording medium, when the first recording medium has enough capacity for recording print designation information.

32. The computer readable medium according to claim 30, further including computer-executable instructions for:

computer-executable instructions for controlling the recording/reproducing unit and the recording unit to read image data designated by the print designation information from the first recording medium and record the read image data and the print designation information on the second recording medium, when the first recording medium has been finalized; and computer-executable instructions for controlling the recording/reproducing unit to record the print designation information on the first recording medium, when the first recording medium has not been finalized.

33. The computer readable medium according to claim 30, wherein the first recording medium includes a rewritable recording medium and a write-once recording medium, the medium further including:

computer-executable instructions for controlling the recording/reproducing unit and the recording unit to read image data designated by the print designation information from the first recording medium and record the read image data and the print designation information on the second recording medium, when the first recording medium is a write-once recording medium; and computer-executable instructions for controlling the recording/reproducing unit to record the print designation information on the first recording medium, when the first recording medium is a rewritable recording medium.

* * * * *